June 20, 1939.  P. W. HOTTON  2,163,339
TRANSMISSION
Filed Dec. 20, 1937   3 Sheets-Sheet 2

Inventor
P. W. Hotton
By Clarence A. O'Brien
Hyman Berman
Attorneys

June 20, 1939.  P. W. HOTTON  2,163,339
TRANSMISSION
Filed Dec. 20, 1937  3 Sheets-Sheet 3

Inventor
P. W. Hotton

By Clarence A. O'Brien
Hyman Berman
Attorneys

Patented June 20, 1939

2,163,339

UNITED STATES PATENT OFFICE 2,163,339

TRANSMISSION

Percy William Hotton, Salisbury, Md.

Application December 20, 1937, Serial No. 180,884

4 Claims. (Cl. 74—293)

This invention appertains to new and useful improvements in transmissions such as are employed in motor vehicles.

The principal object of the present invention is to provide a transmission of the fluid clutch type.

Another important object of the invention is to provide a transmission which will eliminate the usual clutch pedal and clutch plate.

Still another important object of the invention is to provide a transmission wherein the gears are constantly in mesh and wherein the gear ratio is stepped up gradually and not suddenly as in gear shiftable transmissions.

These and various other important objects and advantages of the invention will become apparent to the reader of the following specification.

Figure 1:
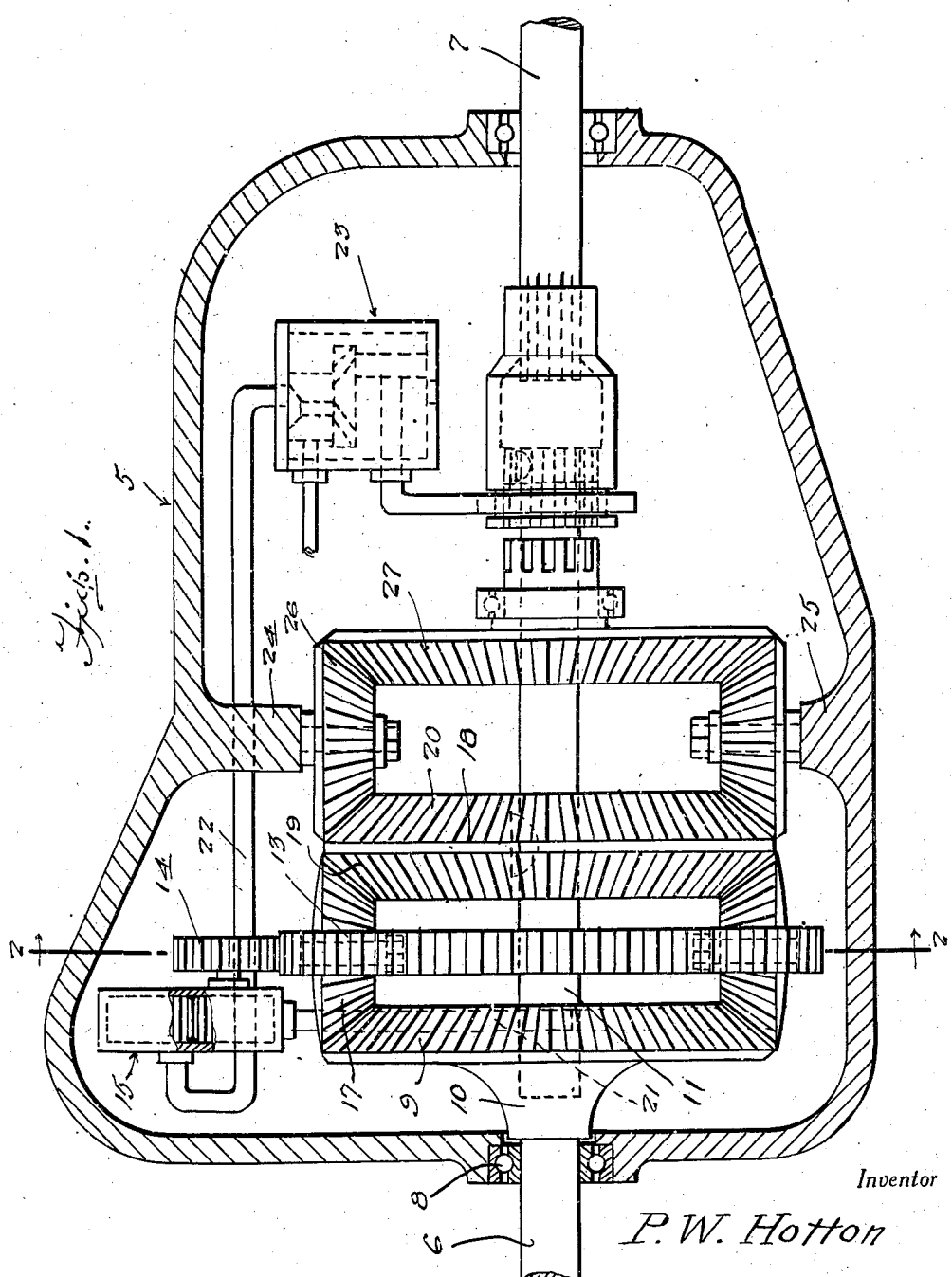
Figure 1 represents a longitudinal sectional view through the transmission.

Referring to the drawings wherein like numerals designate like parts, it can be seen that numeral 5 represents the transmission case which has the drive shaft 6 extending through one end thereof and the driven shaft 7 through the opposite end thereof.

Figure 2:
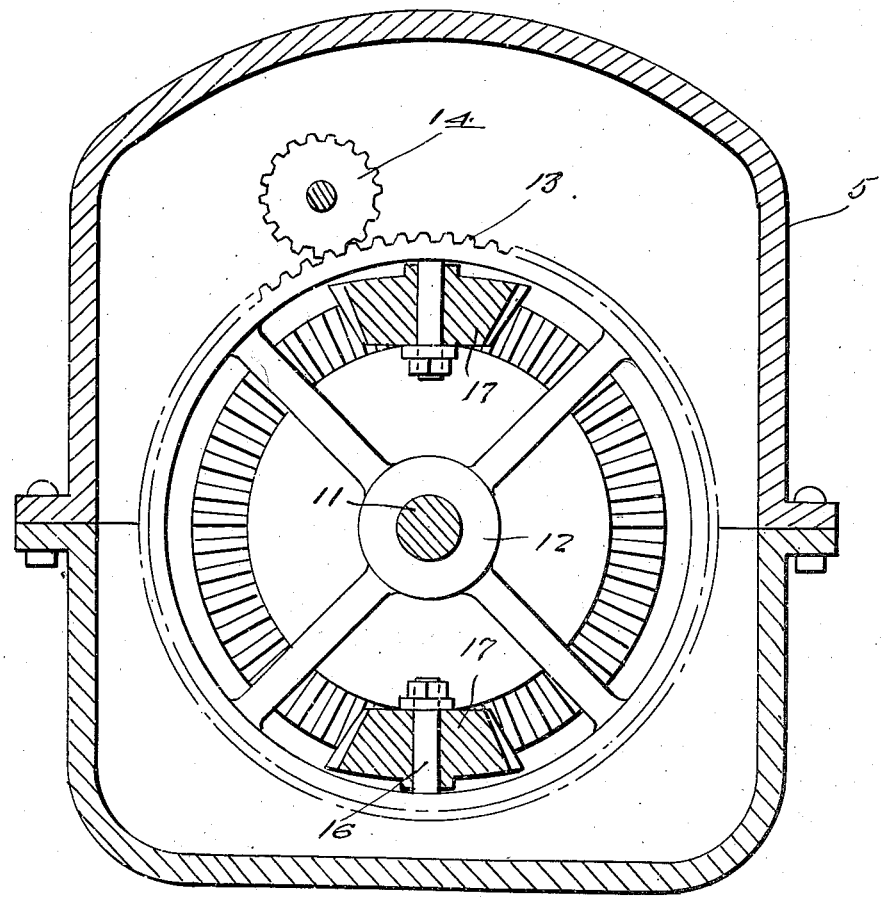
Figure 2 is a transverse sectional view.

The drive shaft 6 extends through the bearing assembly 8 and has the large bevel gear 9 at its rear end. A hub 10 of this gear 9 receives the forward end of the intermediate shaft 11 which as shown in Figure 2 has the spider structure 12 located thereon and carrying the ring gear 13 which meshes with the external gear 14 of the gear pump generally referred to by numeral 15.

Inside of the ring gear 13 are the short radially extending shafts 16 extending inwardly from the ring gear 13 and carrying the bevel pinions 17—17.

Suitably keyed to the intermediate shaft 11 is the bevel gear 18 having the beveled sides 19—20.

The pinions 17 mesh with both the bevel gear 9 and the gear 19.

The pump 15 has the intake tube 21 therefor depending to the bottom of the case 5 and its outlet pipe 22 extends rearwardly in the case to the valve structure generally referred to by numeral 23.

Mounted on the bosses 24—25 in the upper and lower portions of the case 5 are the bevel pinions 26 which mesh with the gears 20 and 27.

The bevel gear 27 is rotatably mounted on the intermediate shaft 11 and has its hub 28 provided with splined slots 29 for receiving the splined ribs 30 at the inside of the slidable sleeve 31, which sleeve is carried by the driven shaft 32, its reduced end portion 33 being splinedly connected to the driven shaft 32 as at 34.

Figure 4:
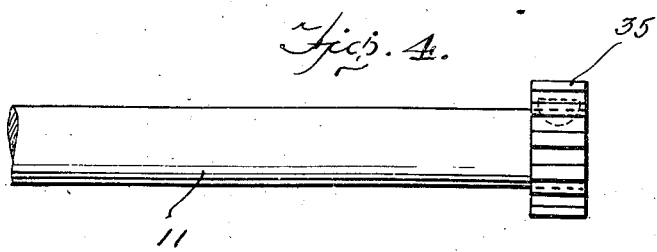
Figure 4 is a fragmentary side elevational view of the intermediate shaft.
Figure 3:
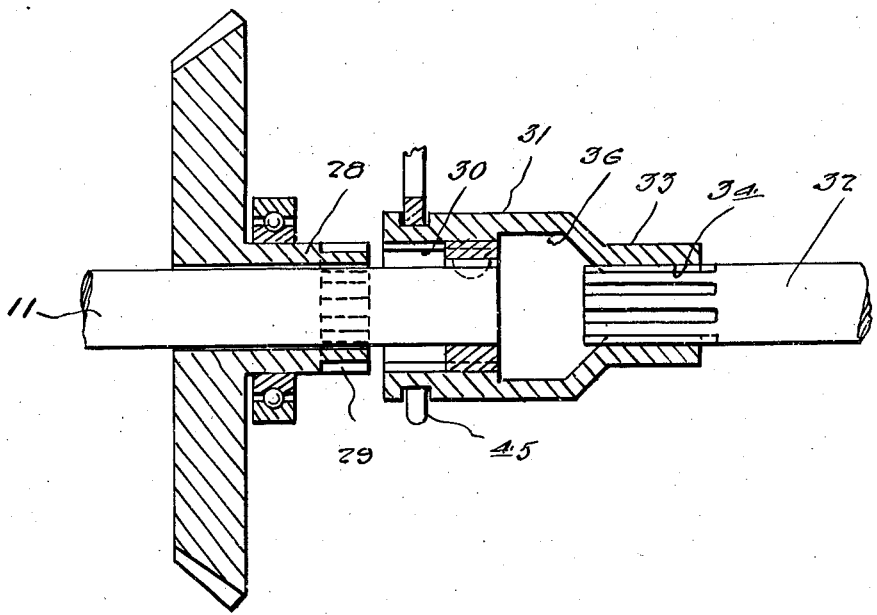
Figure 3 is a fragmentarily longitudinal sectional view through the splined connection.
Figure 5:
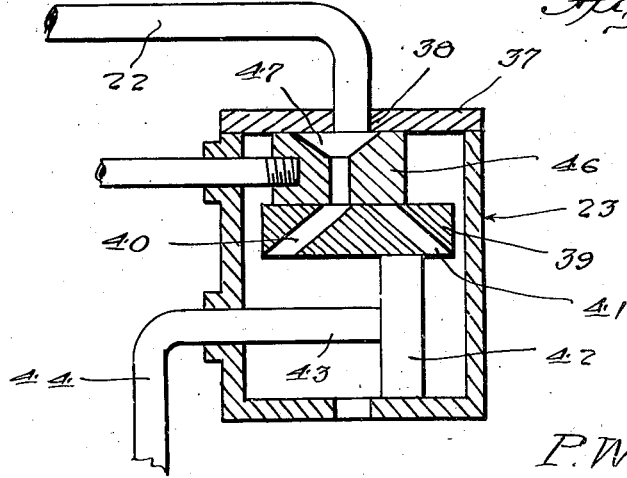
Figure 5 is a fragmentary sectional view through the control valve.

The intermediate shaft 11 is as shown in Figure 4 provided with the splined head 35 which is engageable with the splined ribs 30 of the sleeve 31 or locatable in the pocket 36 when the sleeve 31 has been slid to engage the splined head 35 of the intermediate shaft 11.

The valve structure generally referred to by numeral 23 consists of the case 37 having the inlet 38 for the pump line 22. Numeral 39 represents the distributing block in the case 27 having the diverged ports 40—41 therethrough.

Below the block 39 is the piston 42 which has the rod 43 extending through one side of the case 37 and from which depends the fork 44 for embracing the grooved portion 45 of the sleeve 31.

The slide 46 slidable between the top of the case 37 and the block 39 has the funnel-shaped opening 47 therein registrable with the inlet 38 so that the oil under pressure can be distributed through this opening 47 to either the port 40 or the port 41 depending upon whether the piston 42 is to be shifted toward the right or left for connecting of the drive shaft 32 with the gear 27 or with the shaft 11 by engagement of the head 35 of the shaft 11 with the splined ribs 30. The slide 46 is manually actuated through the rod connected therewith or some other suitable operating means and its position may be easily varied to align the opening 47 thereof with either the port 40 or the port 41 and may also be positioned to close the opening 47 thereof by the block 39 when desiring to place back pressure on the pump 15 to stop operation thereof so that the latter may act to prevent rotation of the ring gear 13.

The suction pipe 21 extends downwardly only to the shaft so that if the oil level drops below this point the apparatus will not function and will require replenishment of the oil.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A transmission comprising a drive shaft, a driven shaft, an intermediate shaft, a planetary gear arrangement consisting of a bevel gear on the drive shaft, a bevel gear on the intermediate shaft, bevel pinions meshing with the bevel gears and interposed between the same, a ring gear carrying the said bevel pinions, a fluid pump having a drive gear meshing with the ring gear, said pump having an inlet and an outlet, a tube extending from the outlet, a distributing valve to which the tube communicates, and clutch means between the driven shaft and the intermediate shaft operative by fluid under pressure distributed by the said valve.

2. A transmission comprising a drive shaft, a driven shaft, an intermediate shaft, a planetary gear arrangement consisting of a bevel gear on the drive shaft, a bevel gear on the intermediate shaft, bevel pinions meshing with the bevel gears and interposed between the same, a ring gear carrying said bevel pinions, a fluid pump having a drive gear meshing with the ring gear, said pump having an inlet and an outlet, a tube extending from the outlet, a distributing valve to which said tube communicates, a bevel gear rotatably mounted on the intermediate shaft and having a hub, another bevel gear on the intermediate shaft and secured thereto, bevel pinions interposed and in mesh with the last-mentioned bevel gears, and clutch means between the driven shaft and the intermediate shaft and the hub of the hub carrying gear and operative by fluid under pressure distributed by said valve.

3. A transmission comprising a drive shaft, a driven shaft, an intermediate shaft having splined notches, a planetary gear arrangement consisting of a bevel gear on the drive shaft, a bevel gear on the intermediate shaft, bevel pinions meshing with the bevel gears and interposed between the same, a ring gear carrying said bevel pinions, a fluid pump having a drive gear meshing with the ring gear, said pump having an inlet and an outlet, a tube extending from the outlet, a distributing valve to which the tube communicates, a bevel gear rotatably mounted on the intermediate shaft and having a hub provided with splined slots, another bevel gear on the intermediate shaft and secured thereto, bevel pinions interposed and in mesh with the last-mentioned bevel gears, and clutch means between the driven shaft and the intermediate shaft operative by fluid under pressure distributed by said valve and including a sleeve splined to the driven shaft and provided with splined formations therein for engaging the splined slots of said hub and also for engaging the splined notches of the intermediate shaft.

4. A transmission comprising a drive shaft, a driven shaft, an intermediate shaft having splined notches, a planetary gear arrangement consisting of a bevel gear on the drive shaft, a bevel gear on the intermediate shaft, bevel pinions meshing with the bevel gears and interposed between the same, a ring gear carrying said bevel pinions, a fluid pump having a driven gear meshing with the ring gear, said pump having an inlet and an outlet, a tube extending from the outlet, a distributing valve to which the tube communicates, a bevel gear rotatably mounted on the intermediate shaft and having a hub provided with splined slots, another bevel gear on the intermediate shaft and secured thereto, bevel pinions interposed and in mesh with the last-mentioned bevel gears, and clutch means between the driven shaft and the intermediate shaft operative by fluid under pressure distributed by said valve and including a sleeve splined on the driven shaft and provided with splined formations therein for engaging the splined slots of said hub and for also engaging the splined notches of the intermediate shaft, said sleeve being provided with an internal pocket for receiving the end portion of the intermediate shaft with the splined notches when the splined formations of the sleeve are in engagement with the splined slots of said hub.

PERCY WILLIAM HOTTON.